(12) United States Patent
Herges (10) Patent No.: US 8,157,073 B2
(45) Date of Patent: Apr. 17, 2012

(54) SEPARABLE CLUTCH FOR A MOTOR VEHICLE WITH AUTOMATIC WEAR AND TEMPERATURE ADJUSTMENT

(75) Inventor: Michael Herges, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 657 days.

(21) Appl. No.: 12/297,781

(22) PCT Filed: Apr. 23, 2007

(86) PCT No.: PCT/EP2007/003526
§ 371 (c)(1),
(2), (4) Date: Feb. 20, 2009

(87) PCT Pub. No.: WO2007/121959
PCT Pub. Date: Nov. 1, 2007

(65) Prior Publication Data
US 2010/0051404 A1 Mar. 4, 2010

(30) Foreign Application Priority Data
Apr. 21, 2006 (DE) .......................... 10 2006 018 555

(51) Int. Cl.
*F16D 25/08* (2006.01)
*F16D 13/75* (2006.01)
(52) U.S. Cl. .............. 192/85.62; 192/111.14; 192/85.53
(58) Field of Classification Search ............... 192/85.51, 192/85.53, 85.49, 85.57, 111.13, 111.14, 192/85.62
See application file for complete search history.

(56) References Cited

U.S. PATENT DOCUMENTS

| 3,548,989 A | * | 12/1970 | Root | 192/70.252 |
| 3,717,072 A | * | 2/1973 | Kaltenthaler et al. | 92/152 |
| 4,280,608 A | | 7/1981 | LaBuda et al. | |
| 4,650,054 A | * | 3/1987 | Fadler | 192/48.603 |

(Continued)

FOREIGN PATENT DOCUMENTS

DE  32 10 922 A1  9/1983

(Continued)

OTHER PUBLICATIONS

Bauer H (ED): "Triebstrangvarianten" Kraftfahrtechnisches Taschenbuch/Bosch Wiesbaden: Vieweg & Sohn, DE, Jun. 13, 2002, pp. 653-655, XP008082160 ISBN: 3-528-13876-9.

(Continued)

*Primary Examiner* — David D Le
*Assistant Examiner* — Lillian Nguyen
(74) *Attorney, Agent, or Firm* — Crowell & Morning LLP (57) ABSTRACT

A separable clutch for a motor vehicle has a clutch plate including a moveably mounted release unit. The clutch is pressure-medium actuated and includes an actuating piston acting on the release unit to engage and disengage the clutch, and a pressure chamber which is delimited at one side by at least one part of the actuating piston and at the other side by at least one part of a clamping piston. At least the actuating piston, the pressure chamber and the clamping piston are resiliently supported in a defined position against the release unit by spring force. The spring force is smaller than a limit force required for actuating the release unit. A pressure change in the pressure chamber, brought about by a clutch actuation causes the clamping piston to actuate a clamping device such that the clamping piston is fixed before the actuating piston actuates the release unit.

19 Claims, 5 Drawing Sheets

U.S. PATENT DOCUMENTS

| | | | | |
|---|---|---|---|---|
| 5,377,579 A | * | 1/1995 | Pierce | 92/63 |
| 5,456,344 A | * | 10/1995 | Nellums | 192/13 R |
| 5,732,811 A | * | 3/1998 | Graton et al. | 192/85.51 |
| 6,098,772 A | * | 8/2000 | Kimmig et al. | 192/70.252 |
| 7,523,999 B2 | * | 4/2009 | Iraschko | 303/89 |
| 7,987,953 B2 | * | 8/2011 | Iraschko | 188/170 |
| 2007/0029156 A1 | * | 2/2007 | Rogner et al. | 192/85 CA |

FOREIGN PATENT DOCUMENTS

| | | |
|---|---|---|
| DE | 38 42 722 C1 | 6/1990 |
| DE | 44 43 511 A1 | 6/1996 |
| DE | 197 22 591 A1 | 12/1998 |
| EP | 0 881 134 B1 | 12/1998 |
| GB | 2116283 A * | 9/1983 |
| GB | 2 287 295 A | 9/1995 |

OTHER PUBLICATIONS

International Search Report dated Aug. 17, 2007 w/English translation (four (4) pages).

International Search Report including English translation (Four (4) pages), dated Aug. 17, 2007.

* cited by examiner

SEPARABLE CLUTCH FOR A MOTOR VEHICLE WITH AUTOMATIC WEAR AND TEMPERATURE ADJUSTMENT

BACKGROUND AND SUMMARY OF THE INVENTION

The invention is based on a separable clutch for a motor vehicle, which separable clutch has a clutch adjuster including movably mounted clutch operator for engaging and disengaging the clutch.

A clutch of the above type is known from the Automotive Handbook from Robert Bosch GmbH, 24$^{th}$ edition, page 654. In the single-disk dry clutch shown there, the pressure force is generated by a plurality of coil springs, which are arranged between a clutch cover and a pressure plate. In the engaged state, the clutch springs press the clutch pressure plate against the clutch disk. The hub of the clutch disk is movable on a clutch shaft and transmits the engine torque to the clutch shaft by way of a splined shaft profile.

The clutch adjuster of the clutch is mechanically actuated by virtue of a clutch cable, which is actuated by a clutch pedal engaging on a release fork. The release fork acts at the other side on the rotationally fixedly mounted clutch operator which, in this way, is moved axially and lifts the clutch pressure plate away from the clutch disk counter to the force of the pressure springs in order to release the force-fitting action. However, the clutch disk wears over time, which results in an increasing clutch actuation travel, such that wear adjustment must take place in order to maintain the grabbing point for a defined pedal travel. This is realized in the known clutch in that an adjusting sleeve on the clutch cable is adjusted. Temperature changes in the clutch, for example as a result of intensified use under high load, are compensated in the prior art by clutch play.

In contrast, the object on which the present invention is based is that of further developing a clutch of the abovementioned type such that the clutch automatically adjusts the respective wear state, including to the respective temperature, and can at the same time be produced more cost-effectively.

The invention is based on the idea that the clutch adjuster is pressure-medium-actuated and includes the following:

a) an actuating piston which acts on the clutch operator for engaging and disengaging the clutch;

b) a pressure chamber which can be acted on with pressure medium and relieved of said action and which is delimited at one side by at least a part of the actuating piston and at the other side by at least a part of a clamping piston;

c) wherein at least the actuating piston, the pressure chamber and the clamping piston are resiliently supported against the clutch operator in a defined position by spring force, which spring force is lower than a limit force required for actuating the clutch operator, and further wherein d) on account of a pressure change in the pressure chamber caused by a clutch actuation, the clamping piston actuates a clamping device in such a way that the clamping piston is fixed before the actuating piston actuates the clutch operator.

In simple terms, this means that the pressure force of the spring supports the axially movably mounted unit, composed at least of the actuating piston, the pressure chamber and the clamping piston, against the clutch operator in such a way that the clutch operator can duly assume a defined position, but the pressure force is not sufficient to actuate the clutch operator for engaging or disengaging the clutch. The present position of the clutch operator relative to the fixed parts of the clutch is dependent, inter alia, on the present wear state of the clutch and/or on the present temperature of the clutch disk, because wear reduces the thickness of the clutch disk, while high operating temperatures require a greater thickness of the clutch disk. In other words, the relatively low pressure force of the spring ensures that the unit is always supported in a defined fashion against the clutch operator which varies its position as a function of the wear state and the temperature of the clutch.

It is also noted that two functions can be performed simultaneously by a single pressure change, in particular a pressure increase in the pressure chamber. On the one hand, the clamping piston is firstly fixedly clamped in its present axial position, which was hitherto supported only by the relatively low pressure force of the spring, and the pressure chamber which is coupled thereto and the actuating piston which is coupled thereto are thereby also placed into a starting position for the subsequent clutch actuation. The latter is brought about by the same pressure increase in the pressure chamber by virtue of the pressure increase causing a movement of the actuating piston which can be supported against the clamping piston via the pressure medium cushion in the pressure chamber. The movement of the actuating piston brings about an actuation of the clutch operator, which thereupon engages or disengages the clutch.

In contrast, if it were sought merely to adapt the position of the actuating piston to the present wear state, the volume of the pressure chamber would increase with increasing wear, as a result of which the solenoid valves which introduce the pressure medium would have to be designed for the pressure medium volume required for the greatest possible level of wear, and would accordingly be of large dimensions and expensive. Furthermore, such an approach would be associated with disadvantages with regard to the controllability of the pressure medium volume, since the volume would change over time.

However, since, according to the invention, the position of the unit composed of the actuating piston, pressure chamber and clamping piston is adapted to the respective wear and temperature state of the clutch, the volume of the pressure chamber remains substantially constant over the entire wear travel or the entire operating temperature range, which has a positive effect on the pressure medium volume used for actuating the clutch. Not least, the pressure chamber can be of small dimensions, which entails small flow cross sections in the upstream solenoid valves, which can as a result be of very small and cost-effective design.

At least the actuating piston, the pressure chamber and the clamping piston are particularly preferably arranged so as to be movable coaxially with respect to a drive input or drive output shaft, which is assigned to an engine or to a transmission. This saves installation space.

The clamping piston can be supported by the clamping device on a tube piece which is connected to a clutch bell and which coaxially surrounds the drive input or drive output shaft, with it being possible for a force-fitting action, which is based on the principle of a wedge effect, to be produced between the clamping piston and the tube piece by the clamping device. Here, the clamping device may be preloaded by at least one spring in a direction which releases the clamping action.

The spring may be supported at one side on the clutch bell. Furthermore, the pressure chamber may be formed between the actuating piston and the clamping piston, which likewise entails a very compact construction.

According to one particularly preferred embodiment, the actuating piston and the clamping piston are mounted within a cylinder which is axially movable on the tube piece and against which the spring is supported at the other side. The pressure chamber is then delimited radially by a cylinder casing wall of the cylinder, and a pressure medium connection for a supply of pressure medium to the pressure chamber can be formed in the cylinder casing wall.

According to one alternative, the spring may be supported at the other side directly on the clamping piston. The clamping piston is then preloaded by the spring in a direction which reduces the size of the pressure chamber.

More precise details can be gathered from the following description of exemplary embodiments.

BRIEF DESCRIPTION OF THE DRAWINGS

Exemplary embodiments of the invention are illustrated in the drawing and are explained in more detail in the following description.

DETAILED DESCRIPTION OF THE DRAWINGS

Figure 1:
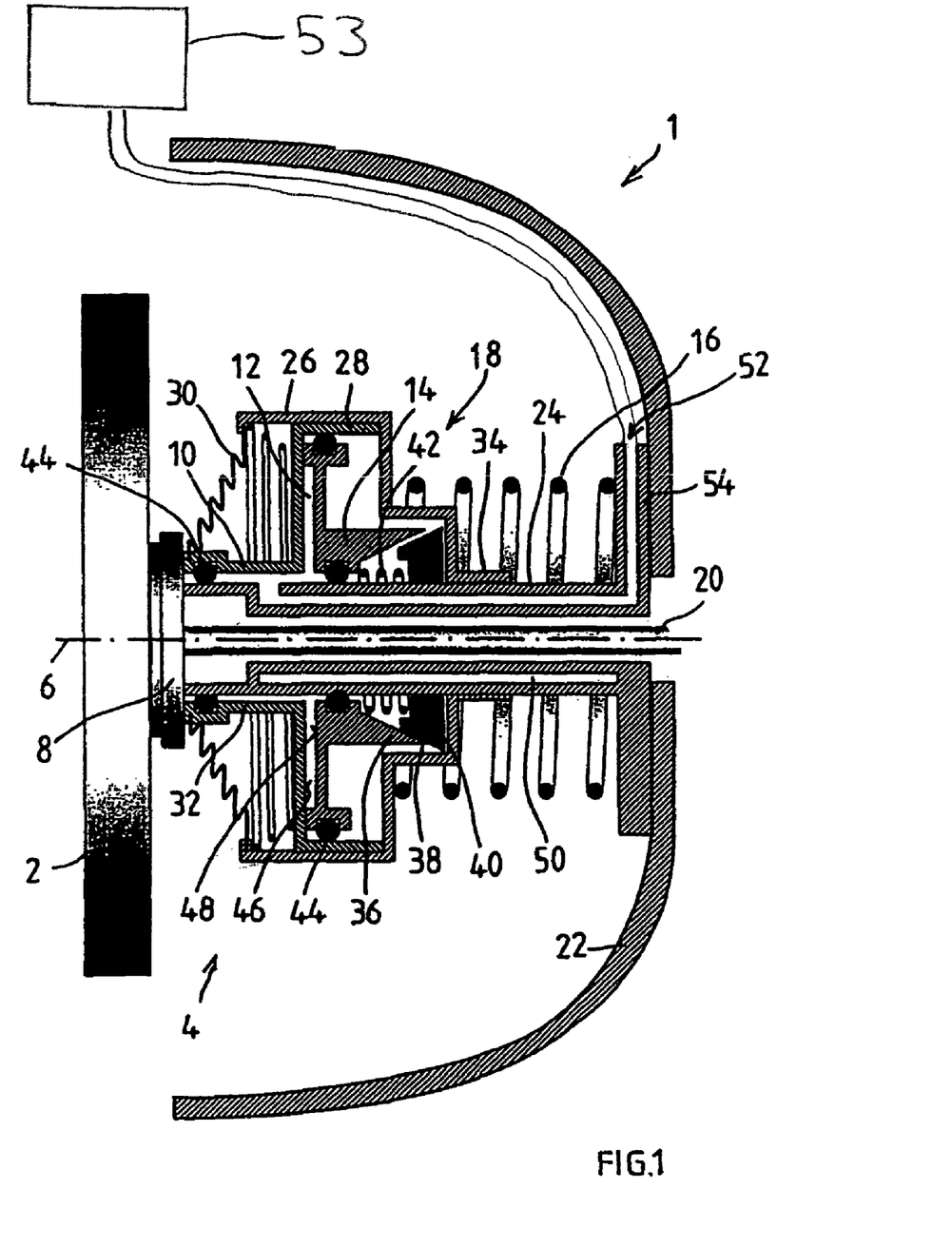
FIG. 1 is a schematic illustration of a separable clutch according to one preferred embodiment of the invention.

The preferred embodiment of a separable clutch shown schematically in FIG. 1 and denoted by the reference symbol 1 is arranged between an engine and a transmission of a vehicle, in particular of a utility or commercial vehicle. The clutch 1 includes a force transmission part 2, which is sufficiently well known and which is therefore illustrated here merely as a unit, composed of a clutch pressure plate, one or more clutch springs which press the clutch pressure plate against a clutch disk, and a flywheel. The force transmission part 2 also includes a pressure-medium-actuated, preferably pneumatically actuated, clutch adjuster 4, which in turn includes, a clutch operator 8, which is mounted so as to be axially movable with respect to a clutch longitudinal axis 6, for engaging and disengaging the clutch 1. The clutch operator 8 is composed of an axial bearing and a pressure ring and interacts, in a known way, via a lever linkage with the clutch pressure plate in order, as a function of the axial position of the clutch operator 8 with respect to the clutch longitudinal axis 6, to lift the clutch pressure plate away from the clutch disk counter to the action of the clutch spring, or to place the clutch pressure plate in frictional, force-fitting engagement with the clutch disk.

The clutch adjuster 4 also includes the following:

a) an actuating piston 10, which acts on the clutch operator 8 for engaging and disengaging the clutch 1;

b) a pressure chamber 12, which can be acted on with pressure medium and relieved of said action and which is delimited at one side by at least a part 46 of the actuating piston 10 and at the other side by at least a part 48 of a clamping piston 14;

c) at least the actuating piston 10, the pressure chamber 12 and the clamping piston 14 are resiliently supported against the clutch operator 8 in a defined position by spring 16. The force which is exerted by the spring 16 is lower than a limit force which is required for actuating the clutch operator 8;

d) on account of a pressure change in the pressure chamber 12 caused by a clutch actuation, the clamping piston 14 actuates a clamping device 18 in such a way that the clamping piston 14 is fixed before the actuating piston 10 actuates the clutch operator 8.

The actuating piston 10, the pressure chamber 12 and the clamping piston 14 are particularly preferably arranged so as to be movable coaxially with respect to the clutch longitudinal axis 6, in particular with respect to a drive input or drive output shaft 20, which is assigned to the transmission. Furthermore, the pressure chamber 12 is formed between at least a part 46 of the actuating piston 10 and at least a part 48 of the clamping piston 14. The clamping piston 14 can be fixed by way of the clamping device 18 to a tube piece 24, which tube piece 24 is rotationally and axially fixedly connected to a clutch bell 22, which is fixed with respect to the vehicle, and which tube piece 24 coaxially surrounds the drive input or drive output shaft 20 and extends from the clutch bell 22 to the force transmission part 2. The spring 16, preferably in the form of at least one coil pressure spring, is supported at one side on the clutch bell 22.

According to one particularly preferred embodiment, the actuating piston 10 and the clamping piston 14 are mounted within a cylinder 26 against which the spring 16 is supported at an outer side. The clamping piston 14 may, in particular, be movably mounted within a piston skirt 28 of the actuating piston 10, which piston skirt 28 is in turn axially guided in the cylinder 26. The cylinder 26 is preferably closed off at its open end, which points toward the force transmission part 2, by a rubber bellows 30 which is fastened at its annular opening edge to a piston rod 32 of the actuating piston 10. The other end of the cylinder 26 is mounted in an axially movable manner with a sleeve 34 on the tube piece 24.

The clamping device 18 includes the clamping piston 14 having a wedge section 36 which interacts with an annular clamping wedge 40 which is divided into a plurality of separate wedge segments 38 in its peripheral direction. The wedge part 40 surrounds the tube piece 24 preferably directly and is actuated axially by the clamping piston 14 when the latter is moved axially with its complementarily shaped wedge section 36. Here, the initially freely-moving wedge segments 38 of the clamping wedge 40 are braced radially inward against the tube piece 24 by the wedge effect so as to produce a force-fitting action with the tube piece 24, which force-fitting action fixes the clamping wedge 40 in an axially and rotationally fixed manner to the tube piece 24.

Here, the clamping piston 14 and the clamping wedge 40 are preloaded by at least one pressure spring 42 in a direction which releases the clamping action, which pressure spring 42 is supported at one side against a radially inner shoulder of the clamping piston 14 and at the other side against the clamping wedge 40. Corresponding seals 44 provide sealing guidance of the clamping piston 14 with respect to the tube piece 24 or with respect to the piston skirt 28 of the actuating piston 10, and of the piston rod 32 of the actuating piston 10 with respect to the tube piece 24.

The pressure chamber 12 is formed between an effective surface 46 of the actuating piston 10 and an effective surface 48 of the clamping piston 14, and is delimited radially at the outside by the piston skirt 28 of the actuating piston 10 and radially at the inside by the tube piece 24, with a pressure medium duct 50 being formed in a tube wall of the tube piece 24. The pressure medium duct 50 opens out at one side into the pressure chamber 12 and at the other side into a pressure medium connection 52 on a plate-shaped, clutch-bell-side fastening flange 54 of the tube piece 24. As pressure medium, use is preferably made of compressed air which is present in the utility or commercial vehicle in any case for actuating the brakes. A pressure medium line is connected to the pressure medium connection 52, which pressure medium line conducts compressed air from a solenoid valve arrangement (schematically-illustrated control valve device 53), which is controlled by electrical signals of an electronic control unit.

In FIG. 1, the clutch 1 is shown in a non-actuated and in a non-worn state, that is to say, the clutch disk has its maximum thickness, as a result of which the clutch operator 8, which interacts by way of the lever mechanism with the clutch pressure plate, has a relatively small axial spacing with respect to the force transmission part 2.

Figure 2:
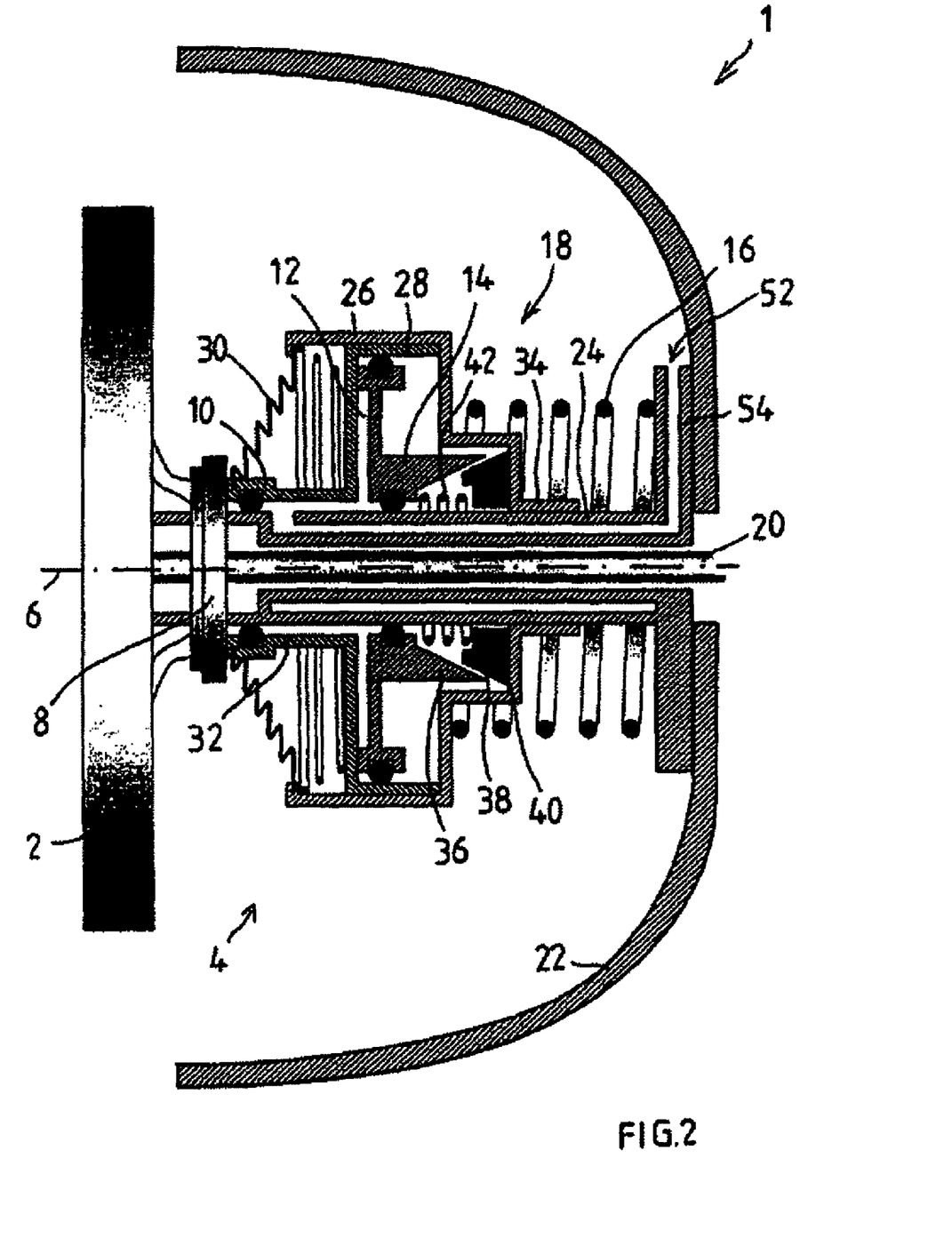
FIG. 2 shows the clutch from FIG. 1 in the worn and non-actuated state.

In contrast, FIG. 2 shows the clutch 1 in a non-actuated state but in a state of advanced wear, in which the clutch disk has a smaller thickness and the clutch operator 8 therefore assumes an axial position which is further away from the force transmission part 2. However, the coil pressure spring 16 ensures that the unit composed of the cylinder 26, actuating piston 10, pressure chamber 12, clamping piston 14, clamping wedge 40, pressure spring 42 and rubber bellows 30 is always supported, via the piston rod 32 of the actuating piston 10, against the clutch operator 8 in a defined axial position, but without actuating the clutch operator 8.

Against this background, the clutch 1 according to the invention functions as follows.

Figure 3:
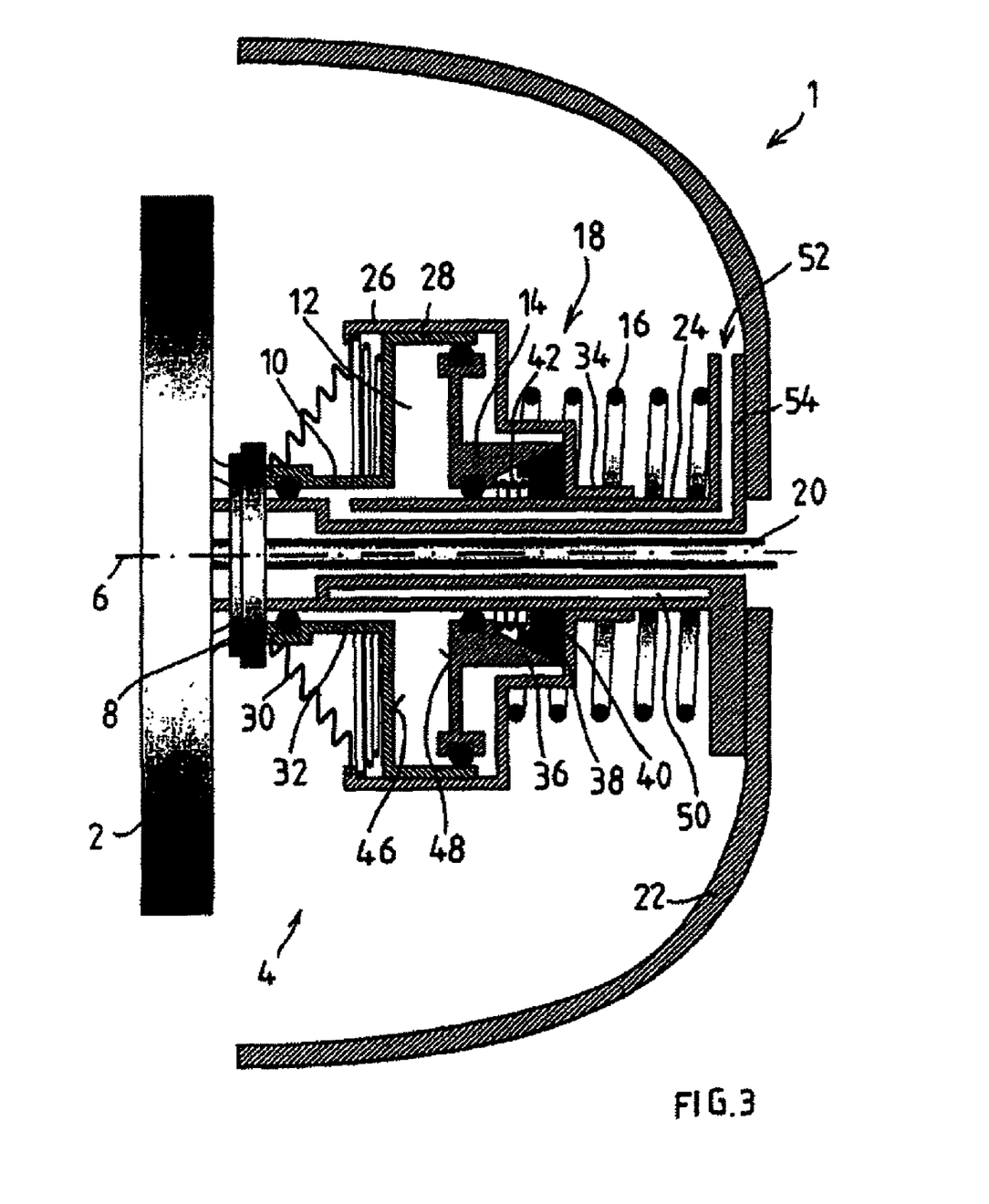
FIG. 3 shows the clutch from FIG. 1 in the worn and actuated state.

Proceeding from the starting position shown in FIG. 2, the driver of the utility vehicle presses down a clutch pedal (not shown here) in order to actuate the clutch. The actuating travel of the clutch pedal is measured by a suitable travel or angle sensor and a corresponding electrical signal is conducted to the control unit, which outputs control signals for the solenoid valve arrangement. As a function of the actuating signals, the solenoid valve arrangement generates a certain compressed air signal at the pressure medium connection 52 of the clutch adjuster 4, which compressed air signal leads to a pressure increase in the pressure chamber 12. Alternatively, the clutch process may also be initiated by a control unit of an automatic transmission. In that case, the solenoid valve arrangement receives the actuating signals directly from the transmission control unit. Two functions are performed simultaneously as a result of the pressure increase in the pressure chamber 12. On the one hand, the clamping piston 14 is firstly fixedly clamped in a defined axial position by virtue of the clamping piston 14 being forced with its wedge section 36 in a direction pointing away from the clutch operator 8 (to the right in FIG. 3) against the clamping wedge 40, and as a result, the initially freely moving wedge segments 38 are moved radially inward so as to generate a force-fitting action with the tube piece 24, which force-fitting action fixes the clamping wedge 40 and therefore also the clamping piston 14 against the tube piece 24 in an axially and rotationally fixed manner. This situation is illustrated in FIG. 3.

The cylinder 26 with the pressure chamber 12, the actuating piston 10, the pressure spring 42 and the rubber bellows 30, is therefore placed into a defined axial starting position, in which it is supported against the clutch operator 8, for the clutch actuation which takes place at a subsequent point-in-time. The clutch actuation is brought about by the same pressure increase in the pressure chamber 12 by virtue of the pressure increase generating a movement of the actuating piston 10 in an opposite direction pointing away from the clamping piston 14 (to the left in FIG. 3), with it being possible for the actuating piston 10 to be supported, via the pressure medium cushion which is now present in the pressure chamber 12, against the clamping piston 14, which is in turn supported against the axially fixed clamping wedge 40. The axial movement of the actuating piston 10 brings about an axial actuation of the clutch operator 8 (to the left in FIG. 3), which thereupon separates the clutch pressure plate from the clutch disk in the force transmission part 2, as a result of which the clutch is disengaged.

To engage the clutch, the pressure in the pressure chamber 12 is reduced by the solenoid valve arrangement, as a result of which the actuating piston 10 can move in the direction of the clamping piston 14 on account of the pressure force, which acts on the clutch operator 8, of the clutch springs in the force transmission part 2. The falling pressure in the pressure chamber 12 also brings about a reduction in the axial pressure force on the clamping piston 14, as a result of which, on account of the spring force of the pressure spring 42, the clamping piston 14 passes out of engagement with the clamping wedge 40 again and the force-fitting action between the tube piece 24 and the clamping wedge 40 is thereby eliminated. In this way, the unit composed of the cylinder 26, the actuating piston 10, the pressure chamber 12, the clamping piston 14, the pressure spring 42 and the rubber bellows 30 is released from the tube piece 24 again and passes into the starting state as per FIG. 2, in which the unit is, in principle, axially freely movable and is held in a defined axial position, abutting against the clutch operator 8, solely by the small spring force of the coil pressure spring 16.

Figure 4:
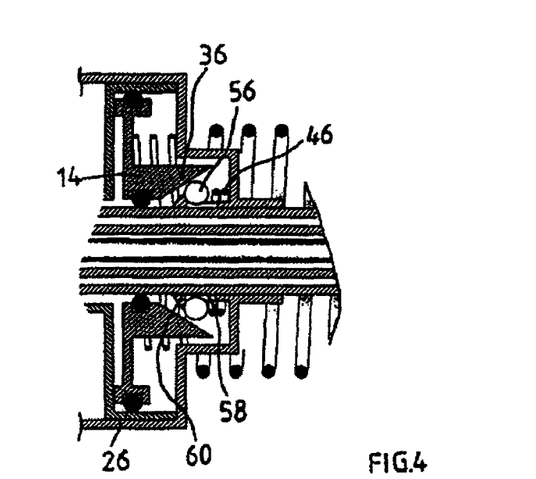
FIG. 4 shows a further embodiment of a clamping device.

FIG. 4 shows a further embodiment of a clamping device 18 having a plurality of clamping balls 56 which are arranged so as to be distributed over the periphery and which are guided in passage grooves 58 of a guide ring 60 which surrounds the tube piece 24 and which is preferably formed in one piece with the cylinder 26. The clamping balls 56 are then, during the axial movement of the clamping piston 14 brought about by the pressure increase in the pressure chamber 12, pressed by the wedge section 36 of the clamping piston 14 into the passage grooves 58 of the guide ring 60 to a greater depth until the clamping balls 56 come into frictionally engaging contact with the tube piece 24 so as to produce a force-fitting action between the clamping piston 14 and the tube piece 24. The clamping balls 56 are preloaded with the tube piece 24 in the out-of-engagement direction by way of the pressure spring 42.

Figure 5:
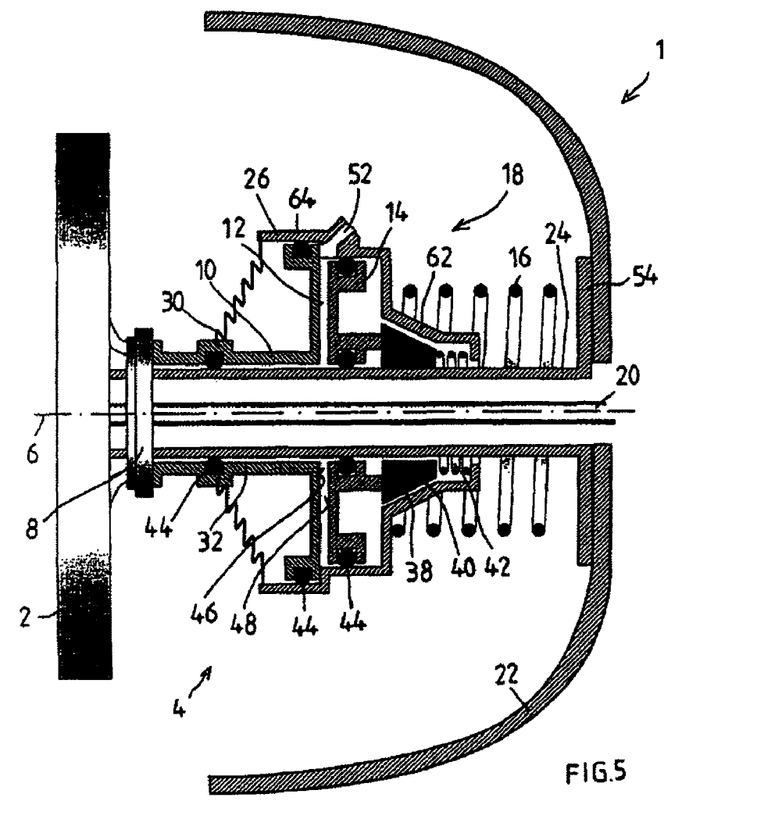
FIG. 5 is a schematic illustration of a separable clutch according to a further embodiment of the invention.

In the further exemplary embodiment of the invention according to FIG. 5, those parts which are identical and functionally identical to those in the preceding example are denoted by the same reference symbols. In contrast to the preceding example, the clamping device 18 includes a wedge section 62, which is formed on the cylinder 26 so as to be of complementary design to the clamping wedge 40, and which can be braced with the clamping wedge 40 by way of a wedge effect. The clamping piston 14 therefore has no wedge section but rather is of cylindrical design. An axial movement of the clamping wedge 40 into the wedge section 62 of the cylinder 26 has the effect that the initially freely movable wedge segments 38 move radially inward so as to generate a force-fitting action with the tube piece 24, which force-fitting action fixes both the clamping wedge 40 and also the cylinder 26 with the actuating piston 10, the clamping piston 14, the pressure spring 42 and the rubber bellows 30 in an axially and rotationally fixed manner to the tube piece 24.

Furthermore, the clamping piston 14 is guided directly on a cylindrical casing wall 64 of the cylinder 26, as a result of which the pressure medium connection 52 may also be formed in the casing wall 64.

Figure 6:
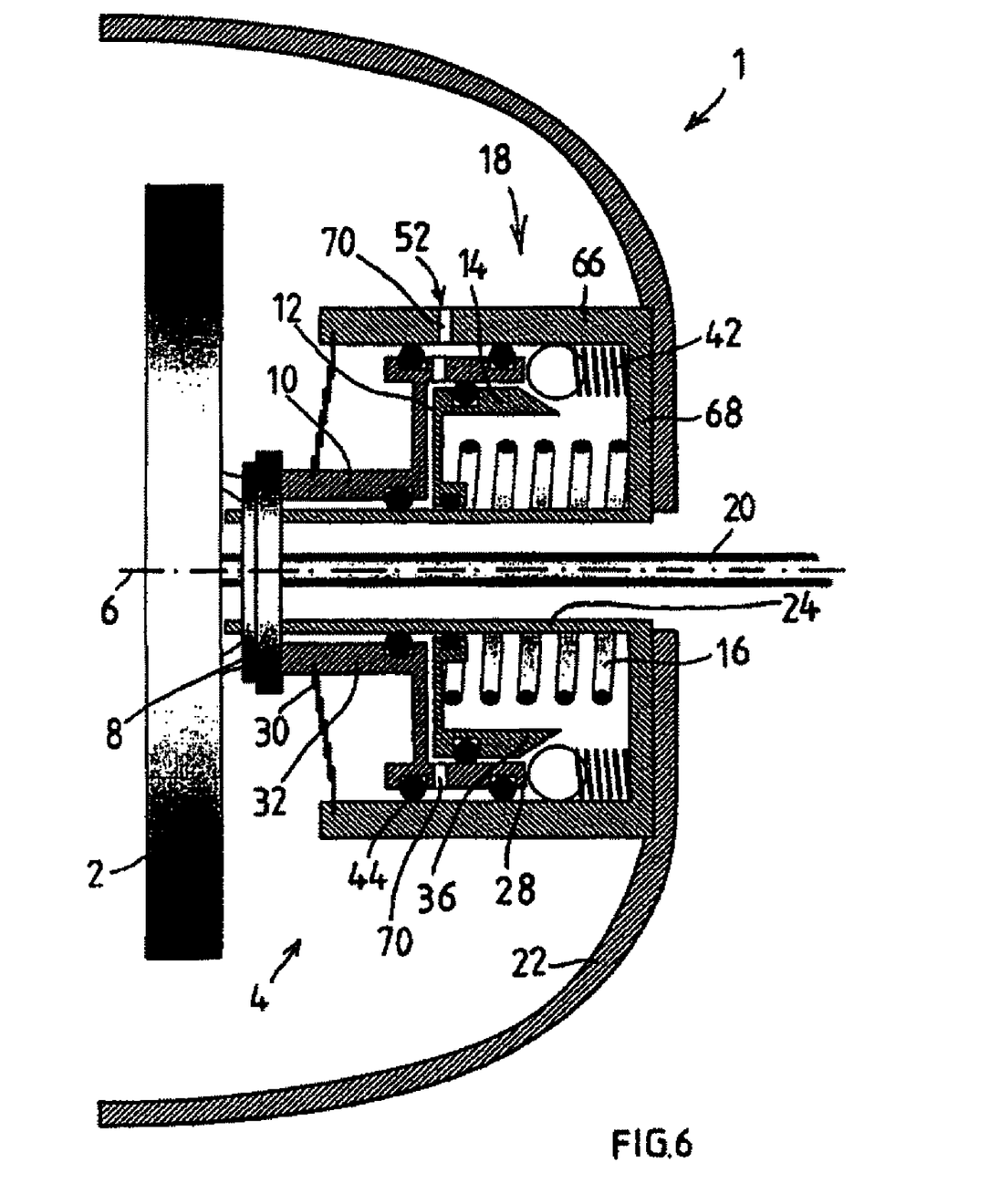
FIG. 6 is a schematic illustration of a separable clutch according to a further embodiment of the invention.

According to the alternative as per FIG. 6, the spring 16 may also be supported directly on the clamping piston 14. The clamping piston 14 is then preloaded by the spring 16 in a direction which reduces the size of the pressure chamber 12. The spring force is transmitted to the actuating piston 10 via the pressure medium cushion in the pressure chamber 12 or else by way of direct abutment, and the actuating piston 10 is then supported with its piston rod 32 against the clutch operator 8.

Furthermore, instead of inner clamping as shown in FIGS. 1 to 5, in which the clamping piston 14 is clamped with the tube piece 24 radially at the inside, radially outer clamping may be provided with a radially outer casing wall 66 which is fixed with respect to the vehicle and which, for example, simultaneously guides the clamping piston 14 and the actuating piston 10, and which is preferably formed in one piece with the tube piece 24 via an annular base 68 which is fastened to the clutch bell 22. The pressure chamber 12 may then be ventilated by passage openings 70 in the casing wall 66 and in the piston skirt 28 of the actuating piston 10. The clamping action may, as in the exemplary embodiment of FIG. 4, take place by an interaction of a wedge section 36 of the clamping piston 14 with clamping balls 56, which are arranged so as to be distributed over the inner periphery of the outer casing wall 66. Furthermore, as in the exemplary embodiment of FIG. 1, the clamping piston 14 is also guided axially within the piston skirt 28 of the actuating piston 10, which piston skirt 28 is in turn mounted in a movable fashion in the casing wall 64 of the cylinder 26.

The invention is not restricted to the exemplary embodiments described here. In fact, numerous further variants are contemplated primarily with regard to the embodiment of the pressure-medium-actuated clamping device. Also, it is not strictly necessary for at least the actuating piston 10 and the clamping piston 14 to be movable in the axial direction; their movements may rather take place in any desired directions.

TABLE OF REFERENCE SYMBOLS

1 Clutch
2 Force transmission part
4 Clutch adjuster
6 Longitudinal axis
8 Clutch operator
10 Actuating piston
12 Pressure chamber
14 Clamping piston
16 Spring means
18 Clamping device
20 Transmission input shaft
22 Clutch bell
24 Tube piece
26 Cylinder
28 Piston skirt
30 Rubber bellows
32 Piston rod
34 Sleeve
36 Wedge section
38 Wedge segments
40 Clamping wedge
42 Pressure spring
44 Seals
46 Effective surface
48 Effective surface
50 Pressure medium duct
52 Pressure medium connection
54 Fastening flange
56 Clamping balls
58 Passage grooves
60 Guide rings
62 Wedge section
64 Casing wall
66 Casing wall
68 Annular base
70 Passage openings

The invention claimed is:

1. A separable clutch for a motor vehicle, comprising:
 a clutch adjuster including a movably mounted clutch operator for engaging and disengaging the clutch, the clutch adjuster being pressure-medium-actuated, and comprising:
 a) an actuating piston, which acts on the clutch operator for engaging and disengaging the clutch;
 b) a pressure chamber, which is pressurizable and relievable of pressure, the pressure chamber being delimited at one side by at least a part of the actuating piston, and at the other side by at least a part of a clamping piston,
 c) wherein at least the actuating piston, the pressure chamber and the clamping piston are resiliently supported against the clutch operator in a defined position by spring force, which spring force is lower than a limit force required for actuating the clutch operator;
 d) wherein, on account of a pressure change in the pressure chamber caused by a clutch actuation, the clamping piston actuates a clamping device such that the clamping piston is fixed before the actuating piston actuates the clutch operator, and
 e) wherein a clamping action, which is based on interaction of a wedge-shaped portion of the clamping piston with an opposing wedge-shaped surface to generate a clamping force, is producible between the clamping piston and the tube piece by the clamping device.

2. The clutch as claimed in claim 1, wherein the actuating piston and the clamping piston are moved in opposite directions on account of a pressure change in the pressure chamber.

3. The clutch as claimed in claim 2, wherein at least the actuating piston, the pressure chamber and the clamping piston are arranged so as to be movable coaxially with respect to a drive input or drive output shaft, which is assigned to an engine or to a transmission.

4. The clutch as claimed in claim 1, wherein at least the actuating piston, the pressure chamber and the clamping piston are arranged so as to be movable coaxially with respect to a drive input or drive output shaft, which is assigned to an engine or to a transmission.

5. The clutch as claimed in claim 4, wherein the clamping piston is supportable by the clamping device on a tube piece which is connected to a clutch bell and which coaxially surrounds the drive input or drive output shaft.

6. The clutch as claimed in claim 5, wherein a section of a pressure medium connection, which connects a control valve device to the pressure chamber is formed in the tube piece.

7. The clutch as claimed in claim 5, wherein the spring force is provided by a spring supported at one side on the clutch bell.

8. The clutch as claimed in claim 7, wherein the actuating piston and the clamping piston are mounted within a cylinder which is axially movable on the tube piece and against which the spring is supported at the other side.

9. The clutch as claimed in claim 8, wherein the pressure chamber is delimited radially by a cylinder casing wall of the cylinder.

10. The clutch as claimed in claim 9, wherein a pressure medium connection for a supply of pressure medium to the pressure chamber is formed in the cylinder casing wall.

11. The clutch as claimed in claim 7, wherein the spring is supported at the other side on the clamping piston.

12. The clutch as claimed in claim 11, wherein the clamping piston is preloaded by the spring in a direction which reduces the size of the pressure chamber.

13. The clutch as claimed in claim 1, wherein the clamping device is preloaded by at least one spring in a direction which releases the clamping action.

14. The clutch as claimed in claim 1, wherein a section of a pressure medium connection, which connects a control valve device to the pressure chamber is formed in the tube piece.

15. The clutch as claimed in claim 1, wherein the spring force is provided by a spring supported at one side on the clamping piston.

16. The clutch as claimed in claim 15, wherein the clamping piston is preloaded by the spring in a direction which reduces the size of the pressure chamber.

17. The clutch as claimed in claim 1, wherein the pressure chamber is formed between the actuating piston and the clamping piston.

18. A pressure-medium-actuated clutch adjuster for use in a separable clutch of a motor vehicle, the clutch adjuster comprising:
   a) an actuating piston, which acts on the clutch operator for engaging and disengaging the clutch;
   b) a pressure chamber, which is pressurizable and relievable of pressure, the pressure chamber being delimited at one side by at least a part of the actuating piston, and at the other side by at least a part of a clamping piston,
   c) wherein at least the actuating piston, the pressure chamber and the clamping piston are resiliently supported against the clutch operator in a defined position by spring force, which spring force is lower than a limit force required for actuating the clutch operator;
   d) wherein, on account of a pressure change in the pressure chamber caused by a clutch actuation, the clamping piston actuates a clamping device such that the clamping piston is fixed before the actuating piston actuates the clutch operator, and
   e) wherein a clamping action, which is based on interaction of a wedge-shaped portion of the clamping piston with an opposing wedge-shaped surface to generate a clamping force, is producible between the clamping piston and the tube piece by the clamping device.

19. The clutch adjuster according to claim 18, wherein the actuating piston and the clamping piston move in opposite directions on account of a pressure change in the pressure chamber.

* * * * *